(12) United States Patent
Paczkowski et al.

(10) Patent No.: US 12,088,660 B2
(45) Date of Patent: *Sep. 10, 2024

(54) DATA COMMUNICATION SYSTEM TO SELECTIVELY AND SECURELY COUPLE DISTRIBUTED LEDGERS WITH ARTIFICIAL INTELLIGENCE (AI) ENGINES

(71) Applicant: T-MOBILE INNOVATIONS LLC, Overland Park, KS (US)

(72) Inventors: Lyle Walter Paczkowski, Mission Hills, KS (US); Ronald R. Marquardt, Woodinville, WA (US); Stephen P. O'Neal, Overland Park, KS (US); Tracy Lee Nelson, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/893,417

(22) Filed: Aug. 23, 2022

(65) Prior Publication Data

US 2022/0407912 A1    Dec. 22, 2022

Related U.S. Application Data

(63) Continuation of application No. 16/276,210, filed on Feb. 14, 2019, now Pat. No. 11,477,266.

(51) Int. Cl.
*H04L 67/10* (2022.01)
*G06F 16/27* (2019.01)
(Continued)

(52) U.S. Cl.
CPC .............. *H04L 67/10* (2013.01); *G06F 16/27* (2019.01); *G06N 5/043* (2013.01); *H04W 12/10* (2013.01); *H04W 76/11* (2018.02); *H04L 67/01* (2022.05)

(58) Field of Classification Search
CPC ...... G06F 16/27; G06F 16/273; G06F 16/275; G06F 16/278; G06N 5/00; G06N 5/043; H04L 67/10

See application file for complete search history.

(56) References Cited

U.S. PATENT DOCUMENTS

| 6,275,789 B1 | 8/2001 | Moser et al. |
| 2003/0155415 A1 | 8/2003 | Markham et al. |

(Continued)

FOREIGN PATENT DOCUMENTS

| WO | 2017214271 A1 | 12/2017 |
| WO | 2018170253 A1 | 9/2018 |
| WO | 2018218259 A1 | 11/2018 |

*Primary Examiner* — Emmanuel L Moise
*Assistant Examiner* — Xiang Yu

(57) ABSTRACT

A wireless communication system generates Artificial Intelligence (AI) responses to network data. Computer circuitry hosts network functions, distributed ledgers, ledger clients, and AI engines. The network functions serve User Equipment (UEs) over Radio Access Networks (RANs), and in response, transfer the network data to the distributed ledgers. The distributed ledgers receive and store the network data. The ledger clients select some of the network data from the distributed ledgers and transfer the selected network data to the AI engines. The AI engines receive the selected network data, and in response, generate the AI responses. The ledger clients and the AI engines may comprise wireless network slices.

20 Claims, 6 Drawing Sheets

(51) Int. Cl.
  *G06N 5/043* (2023.01)
  *H04W 12/10* (2021.01)
  *H04W 76/11* (2018.01)
  *H04L 67/01* (2022.01)

(56) References Cited

U.S. PATENT DOCUMENTS

2017/0221032 A1   8/2017  Mazed
2018/0247191 A1   8/2018  Katz et al.
2018/0284758 A1  10/2018  Cella et al.
2018/0295546 A1  10/2018  Crawford
2019/0333096 A1* 10/2019  Johnson ................ H04L 63/123
2019/0387000 A1* 12/2019  Zavesky ................. H04L 67/51

\* cited by examiner

US 12,088,660 B2

DATA COMMUNICATION SYSTEM TO SELECTIVELY AND SECURELY COUPLE DISTRIBUTED LEDGERS WITH ARTIFICIAL INTELLIGENCE (AI) ENGINES

RELATED CASES

This United States Patent Application is a continuation of U.S. patent application Ser. No. 16/276,210 that was filed on Feb. 14, 2019 and is entitled "DATA COMMUNICATION SYSTEM TO SELECTIVELY AND SECURELY COUPLE DISTRIBUTED LEDGERS WITH ARTIFICIAL INTELLIGENCE (AI) ENGINES." U.S. patent application Ser. No. 16/276,210 is hereby incorporated by reference into this United States Patent Application.

TECHNICAL BACKGROUND

A single distributed ledger comprises a computer network of ledger nodes. The ledger nodes each maintain a copy of ledger data in a blockchain database format. The blockchain database format stores a hash of the previous block in the current block. These hashes and the number of ledger nodes make the ledger data virtually immutable. The ledger nodes have endorser nodes that receive proposed ledger transactions. The endorser nodes process chain code to execute test ledger transactions based on the proposals and may endorse the test transactions per ledger endorsement rules. When ledger transactions are endorsed, ledger orderer nodes distribute the endorsed ledger transactions to peer nodes per orderer rules. The peer nodes process the chain code to execute the endorsed ledger transactions. The peer ledger nodes may reach a consensus on the executed ledger transactions, and when peer consensus is formed, the peer ledger nodes commit the ledger transactions to the immutable blockchain database and transfer any chain code outputs.

Artificial Intelligence (AI) engines comprise a computer network of AI nodes. Input AI nodes receive data and pass data through layers of hidden AI nodes for processing. The AI nodes may apply a myriad of algorithms and interconnections. A simple AI algorithm comprises the classic "if then" statement. The final layer of hidden AI nodes transfer data to output AI nodes that transfer AI outputs to various data systems. The AI nodes may comprise neural networks, machine-learning systems, and the like.

Data communication systems are used to couple distributed ledgers to AI engines. Unfortunately, current data communication systems do not selectively and securely couple the distributed ledgers to the AI engines. Moreover, the data communication systems do not use wireless user devices and radio access networks to securely load the distributed ledgers with pertinent data for the AI engines.

TECHNICAL OVERVIEW

A wireless communication system generates Artificial Intelligence (AI) responses to network data. Computer circuitry hosts network functions, distributed ledgers, ledger clients, and AI engines. The network functions serve User Equipment (UEs) over Radio Access Networks (RANs), and in response, transfer the network data to the distributed ledgers. The distributed ledgers receive and store the network data. The ledger clients select some of the network data from the distributed ledgers and transfer the selected network data to the AI engines. The AI engines receive the selected network data, and in response, generate the AI responses. The ledger clients and the AI engines may comprise wireless network slices.

DETAILED DESCRIPTION

Figure 1:
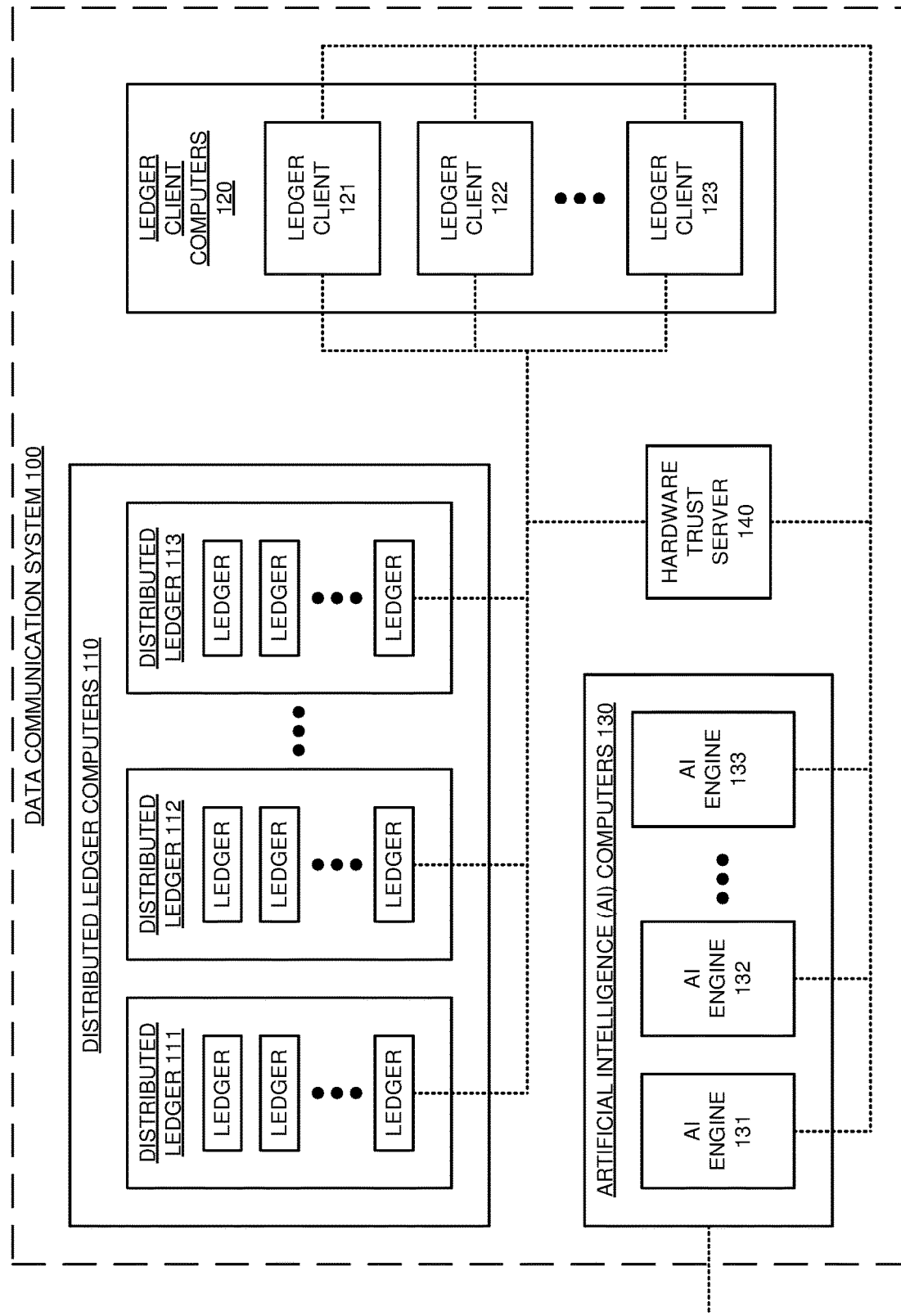
FIG. 1 illustrates a data communication system that selectively transfers top block data from distributed ledgers to Artificial Intelligence (AI) engines.

FIG. 1 illustrates data communication system 100 that selectively transfers top block data from distributed ledgers 111-113 to Artificial Intelligence (AI) engines 131-133. Data communication system 100 comprises distributed ledger computers 110, ledger client computers 120, AI computers 130, and hardware trust server 140. Distributed ledger computers 110 host distributed ledgers 111-113. Ledger client computers 120 host ledger clients 121-123. AI computers 130 host AI engines 131-133. Distributed ledgers 111-113 and ledger clients 121-123 communicate over data communication links. Ledger clients 121-123 and AI engines 131-133 communicate over data communication links. Hardware trust server 140 communicates with distributed ledgers 111-113, ledger clients 121-123, and AI engines 131-133 over data communication links. Data communication system 100 has been simplified for clarity and typically includes many more distributed ledgers, ledger clients, and AI engines.

Distributed ledger computers 110 comprise processing circuitry, memory circuitry, bus circuitry, transceiver circuitry, and software. Distributed ledgers 111-113 each comprise portions of this circuitry and software. Distributed ledger computers 110 have hardware-trust codes that are physically-embedded in read-only memory circuitry. Distributed ledgers 111-113 each maintain ledgers, and the ledgers for a single distributed ledger are hosted by a geographically-diverse set of distributed ledger computers 110. Distributed ledgers 111-113 use the hardware-trust codes to establish hardware-trust with hardware trust server 140. In some examples, distributed ledger computers 110 and distributed ledgers 111-113 are integrated within a wireless network slice and/or a Network Function Virtualization Infrastructure (NFVI).

Ledger client computers 120 comprise processing circuitry, memory circuitry, bus circuitry, transceiver circuitry, and software. Ledger clients 121-123 each comprise portions of this circuitry and software. Ledger client computers 120 have hardware-trust codes that are physically-embedded in read-only memory circuitry. Ledger clients 121-123 use the hardware-trust codes to establish hardware-trust with hardware trust server 140. Ledger clients 121-123 are configured to discover and read top block information from distributed ledgers 111-113 and selectively transfer the information to AI engines 1231-132. For example, ledger client 121 may read the top blocks of distributed ledgers 111-112 while ledger client 123 reads the top blocks of ledgers 112-113. Ledger client 121 may then transfer select read data to AI engines 132-133 while ledger client 123 transfers select read data to AI engines 131-132. In some examples, ledger client computers 120 and ledger clients 121-123 are integrated within a wireless network slice and/or NFVI.

AI computers 130 comprise processing circuitry, memory circuitry, bus circuitry, transceiver circuitry, and software. AI engines 131-133 each comprise portions of this circuitry and software. AI computers 130 have hardware-trust codes that are physically-embedded in read-only memory circuitry. AI engines 131-133 use the hardware-trust codes to establish hardware-trust with hardware trust server 140. AI engines 131-133 are configured to process the select top block information from select distributed ledgers 111-113 through its AI nodes to generate AI responses. The AI nodes apply various algorithms and interconnections. A simple AI algorithm comprises an "if then" statement although typical algorithms are more complex. The AI nodes may comprise neural networks, machine-learning systems, and/or the like. In some examples, AI computers 130 and AI engines 131-133 are integrated within a wireless network slice and/or NFVI. In some examples, AI computers 130 and AI engines 131-133 are integrated within wireless User Equipment (UEs), and the UEs may be integrated within a wireless network slice.

Hardware-trust server 140 comprises a computer system that has processing circuitry, memory circuitry, bus circuitry, transceiver circuitry, and software. Hardware-trust server 140 has copies of the hardware-trust codes that are physically-embedded in computers 110, 120, and 130. Hardware-trust server 140 stores hardware-trust codes to verify hardware-trust and issue hardware-trust digital certificates. In some examples, hardware-trust server 140 is integrated within a wireless network slice and/or NFVI.

In operation, hardware-trust server 140 establishes hardware-trust with distributed ledgers 111-113, ledger clients 121-123, and AI engines 131-133. Hardware-trust server 140 issues random number challenges to distributed ledgers 111-113, ledger clients 121-123, and AI engines 131-133. Distributed ledgers 111-113, ledger clients 121-123, and AI engines 131-133 hash the random numbers with their own hardware-trust codes to generate and return hardware-trust results. Hardware trust server 140 hashes the same random numbers with its copy of the hardware-trust codes to generate the same hardware-trust results. If the hardware-trust results match, then hardware-trust server 140 signs and transfers hardware-trust digital certificates to distributed ledgers 111-113, ledger clients 121-123, and AI engines 131-133.

Ledger clients 121-123 discover distributed ledgers 111-113. The discovery process may entail the translation of a ledger identifier, slice identifier, NFVI identifier or the like into distributed ledger addresses or names. The discovery process may entail a query to a slice controller with a slice identifier and the receipt of a response with the ledger addresses. The discovery process may be directed by NFVI forwarding graphs and service descriptors. Ledger clients 121-123 and distributed ledgers 111-113 exchange hardware-trust digital certificates to establish hardware-trust. To establish hardware-trust, the hardware-trust digital certificates are decoded with the public key for hardware-trust server 140 to verify their hardware-trust content. Ledger clients 121-123 and/or distributed ledgers 111-113 enter alarm status if hardware-trust fails. Ledger clients 121-123 may each interact with a different set of distributed ledgers 111-113.

Ledger clients 121-123 discover AI engines 121-123. The discovery process may entail the translation of an AI identifier, slice identifier, NFVI identifier or the like into AI engine addresses or names. The discovery process may entail a query to a slice controller with a slice identifier and the receipt of a response with the AI engine addresses or names. The discovery process may be directed by NFVI forwarding graphs and service descriptors. Ledger clients 121-123 and AI engines 131-133 exchange hardware-trust digital certificates to establish hardware-trust. To establish hardware-trust, the hardware-trust digital certificates are decoded with the public key for hardware-trust server 140 to verify their hardware-trust content. Ledger clients 121-123 and/or AI engines 131-133 enter alarm status if hardware-trust fails. Ledger clients 121-123 may each interact with a different set of AI engines 131-133

After discovery and hardware-trust are performed, ledger clients 121-123 read ledger information from top data blocks of distributed ledgers 111-113. Ledger clients 121-123 select some of this ledger information and select some of AI engines 131-133 to receive the selected ledger information. Ledger clients 121-123 transfer the selected ledger information to the selected AI engines 131-133. The selected AI engines 131-133 process the selected ledger information and responsively generate and transfer AI responses. The ledger data selection processes may be directed by NFVI forwarding graphs and service descriptors.

When computers 110 host new distributed ledgers, ledger clients 121-123 discover the new distributed ledgers. For example, the new distributed ledgers may initially signal ledger clients 121-123 or a network controller may inform ledger clients 121-123 of the new distributed ledgers. Ledger clients 121-123 establish hardware-trust with the new distributed ledgers. Ledger clients 121-123 read ledger information from top data blocks of the new distributed ledgers. Ledger clients 121-123 select ledger information and select AI engines to receive the select ledger information. Ledger clients 121-123 transfer the select ledger information to the select AI engines 131-133. The selected AI engines 131-133 then process the select ledger data from distributed ledgers 111-113 and the new distributed ledgers to generate new AI responses.

When computers 130 host new AI engines, ledger clients 121-123 discover the new AI engines. For example, the new AI engines may initially signal ledger clients 121-123 or a network controller may inform ledger clients 121-123 of the new AI engines. Ledger clients 121-123 establish hardware-trust with the new AI engines. Ledger clients 121-123 read ledger information from top data blocks of distributed ledgers 111-113. Ledger clients 121-123 select ledger information and select new AI engines to receive the select ledger information. Ledger clients 121-123 transfer the select ledger information to the new AI engines. The new AI engines processes the select ledger information from distributed ledgers 111-113 to generate new AI responses.

In some examples, additional computers also host Radio Access Networks (RANs). Distributed ledgers 131-133 establish hardware-trust with the RANs through core their networks. The RANs serve wireless communication devices and responsively transfer ledger information to distributed ledgers 111-113. The wireless communication devices execute user applications. The RANs establish hardware-trust with the user applications executing in the wireless communication devices. The user applications transfer ledger information to distributed ledgers 111-113 over the RANs. In some examples, the RANs host distributed ledgers and/or AI engines.

Advantageously, ledger clients 121-123 selectively and securely couple distributed ledgers 111-113 to AI engines 131-133.

Figure 2:
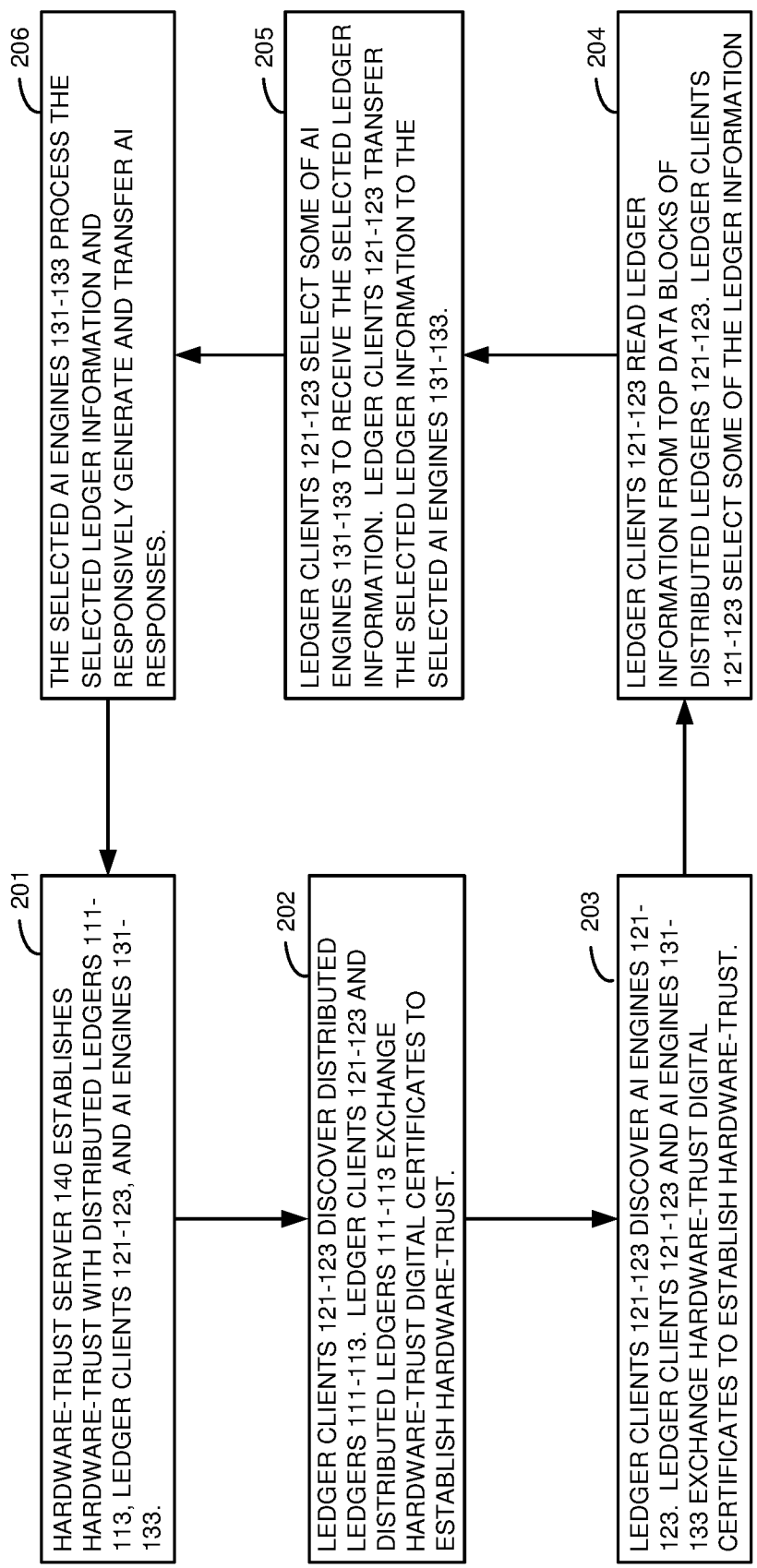
FIG. 2 illustrates the operation of the data communication system to selectively transfer top block data from distributed ledgers to the AI engines.

FIG. 2 illustrates the operation of data communication system 100 to selectively transfer top block data from distributed ledgers 111-113 to AI engines 131-133. Hardware-trust server 140 establishes hardware-trust with distributed ledgers 111-113, ledger clients 121-123, and AI engines 131-133 (201). Ledger clients 121-123 discover distributed ledgers 111-113 and share their hardware-trust digital certificates to establish hardware-trust (202). Ledger clients 121-123 discover AI engines 121-123 and share hardware-trust digital certificates to establish hardware-trust (203). Ledger clients 121-123 read ledger information from top data blocks of distributed ledgers 121-123 and select some of the ledger information (204). Ledger clients 121-123 select AI engines 131-133 to receive the selected ledger information and transfer the selected ledger information to the selected AI engines 131-133 (205). The selected AI engines 131-133 process the selected ledger information and responsively generate and transfer AI responses (206). Advantageously, data communication system 100 selectively and securely couples distributed ledgers 111-113 to AI engines 131-133.

Figure 3:
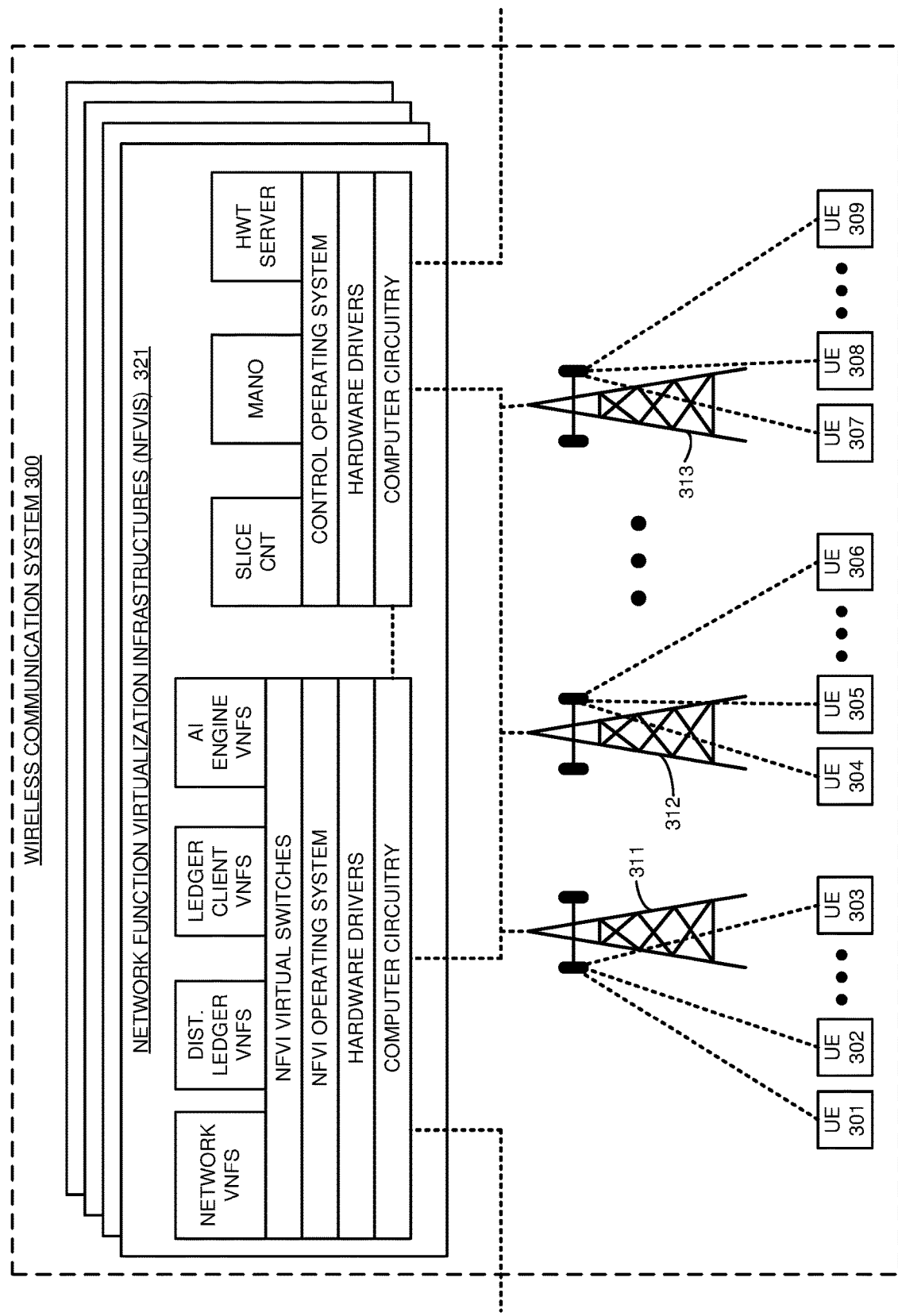
FIG. 3 illustrates a wireless communication system comprising a Network Function Virtualization Infrastructure (NFVI) that selectively transfers top block data from distributed ledgers to AI engines.

FIG. 3 illustrates wireless communication system 300 comprising Network Function Virtualization Infrastructures (NFVIs) 321 that selectively transfer top block data from distributed ledgers to AI engines. Wireless communication system 300 is an example of data communication system 100 although system 100 could differ. Wireless communication system 300 comprises (User Equipment) UEs 301-309, Radio Access Networks (RANs) 311-313, and NFVIs 321. NFVIs 321 each comprise computer circuitry, hardware drivers, NFVI operating systems, NFVI virtual switches, network Virtual Network Functions (VNFs), distributed (DIST.) ledger VNFs, AI engine VNFs, control operating systems, slice controllers (CNT), Management and Orchestration (MANO), and hardware-trust (HWT) server. UEs 301-309 exchange data with one another and with RANs 311-313 over wireless data links. RANs 311-312 exchange data with one another and with NFVIs 321 over data links. NFVIs 321 exchange data with one another and external systems over data links. Wireless communication system 300 has been simplified for clarity and typically includes many more UEs, RANs, and NFVIs than the amount shown.

UEs 301-309 comprise radio circuitry and control circuitry. The radio circuitry comprises antennas, modulators, amplifiers, filters, digital/analog interfaces, processing circuitry, memory circuitry, firmware/software, and bus circuitry. The control circuitry comprises processing circuitry, memory circuitry, bus circuitry, and software. The software is stored in the memory circuitry and includes operating system, network applications, and user applications. In the baseband circuitry, the processing circuitry executes operating system, network applications, and user applications. In some examples, UEs 301-309 also host distributed ledgers and/or AI engines.

RANs 311-313 comprise wireless access points and backhaul circuitry. The wireless access points include LTE eNodeBs, 5GNR gNodeBs, WIFI access points, and/or the like. The backhaul circuitry comprises Time Division Multiplexing (TDM), IEEE 802.3 (Ethernet), Internet Protocol (IP), Data Over Cable System Interface Specification (DOCSIS), Wave Division Multiplexing (WDM), LTE, 5GNR, WIFI, and/or the like. The wireless access points comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. The software is stored in the memory circuitry and includes an operating system and network applications. In the baseband circuitry, the processing circuitry executes the operating system and network applications to exchange data between UEs 301-309 and NFVIs 321. In some examples, RANs 311-313 also host distributed ledgers and/or AI engines.

NFVIs 321 comprise computer circuitry and software. The computer circuitry comprises processing circuitry like Central Processing Units (CPUs), Graphics Processing Units (GPUs), and/or Application Specific Integrated Circuits (ASICs). The computer circuitry comprises memory circuitry like Random Access Memory (RAM), flash drives, and/or disc drives. The computer circuitry comprises transceiver circuitry like Network Interface Cards (NICs), networking System-On-Chip (SOC), and/or bus interfaces. The computer circuitry includes bus circuitry to interconnect the processing circuitry, memory circuitry, and transceiver circuitry. The software is stored in the memory circuitry and is executed in the processing circuitry.

The hardware drivers communicate with hardware components like CPUs, RAM, flash dives, bus interfaces, NICs, and the like The NFVI operating system and the control operating system communicate with the various hardware drivers. The NFVI operating system may include hypervisors, NFV control agents, and the like. The NFVI virtual switches couple the VNFs and interface the VNFs to the NFVI operating system. The slice controller directs the creation, modification, and termination of network slices by signaling the MANO, hardware-trust server, RANs 311-313, and UEs 301-309. The MANO includes an orchestrator, Virtual Infrastructure Manager (VIM), and VNF Manager (VNFM) to control the execution of VNFs in NFVIs 321. The hardware-trust server issues hardware-trust challenges, verifies hardware-trust results, and transfers hardware-trust digital certificates. The distributed ledger VNFs endorse transactions, execute transactions, store data in immutable block chains, and transfer ledger output data. The ledger client VNFs selectively interface the distributed ledger VNFs and the AI engine VNFs. The AI engine VNFs process select ledger data from the top blocks to generate AI responses.

The network VNFs comprise User Plane Function (UPF), Access and Mobility Management Function (AMF), Session Management Function (SMF), Authentication Server Function (AUSF), Policy Control Function (PCF), Unified Data Management (UDM), Application Function (AF), Network Repository Function (NRF), Network Slice Selection Function (NSSF), Network Exposure Function (NEF), Mobility Management Entity (MME), Home Subscriber System (HSS), Serving Gateway (S-GW), Packet Data Network Gateway (P-GW), Policy Control Rules Function (PCRF), Call State Control Functions (CSCFs), and typically other network functions. The UPF routes data packets and forms an anchor point for user mobility. The LIPP inspects packets and applies Quality-of-Service. The AMF manages authentication, authorization, connections, mobility, N1 signaling, ciphering, registration, and security. The SMF manages session establishment, modification, and release. The SMF handles network addressing, Dynamic Host Control Protocol (DHCP), N1 signaling, downlink notification, and traffic steering. The AUSF authenticates and authorizes users. The UDM generates user authentication credentials and supports user identification, authorization, and subscriptions. The PCF provides policy rules and decisions. The AF routes traffic and implements policy controls. The NRF enables service discovery and maintain network function profiles/instances. The NSSF selects network slices to serve users and determine slice assistance information and AMFs. The NEF exposes capabilities and events. The NEF securely interacts with external applications and translates internal/external information.

The MME manages session establishment, modification, and release. The MME also manages authentication, authorization, mobility, Non-Access Stratum signaling, ciphering, registration, and security. The HSS authenticates and authorizes users and indicates user services. The HSS also generates user authentication credentials and supports user identification and authorization. The S-GW serves wireless access points, routes data packets, and applies QoS. The P-GW routes data packets, handles network addressing, DHCP, forms anchor points for user mobility, inspects packets, and applies QoS. The PCRF provides policy rules and decisions. The CSCFs comprise Session Initiation Protocol (SIP) servers that register UEs and control user media sessions by distributing addresses between UEs.

In some examples, the slice controller is configured to launch a network slice that includes UEs 301-309, RANs 311-313, and NFVIs 321. The slice controller loads distributed ledger applications in UEs 301-309 and RANs 311-313. The slice controller also loads hardware-trust applications in UEs 301-309 and RANs 311-313. The slice controller loads the hardware trust server with hardware trust codes and hash algorithms. UEs 301-309 and/or RANs 311-313 may also be configured by the slice controller to host distributed ledgers and/or AI engines.

The slice controller directs the MANO to instantiate forwarding graphs and service descriptors for the network slice. The forwarding graphs and service descriptors specify the network VNFs, distributed ledger VNFs, ledger client VNFs, AI engine VNFs, virtual switch connections, and physical network interconnections in NFVIs 321. The MANO directs the NFVI operating systems to execute and serve the VNFs for the network slice per quality-of-service metrics in the forwarding graphs. The NFVI operating system loads and executes the VNFs, virtual switches, and other virtual machine components. The VNFs establish connectivity to one another, MANO, hardware-trust server, and RANs 311-313 based on their forwarding graphs and service descriptors. For example, AMF, SMF, UPF, AUSF, UDM, and PCF VNFs are started to serve UEs 301-309. The distributed ledger, ledger client, and AI engine VNFs are also started. The VNFs interact with the hardware trust server to establish hardware-trust and obtain hardware-trust digital certificates. The VNFs establish connectivity and exchange hardware-trust digital certificates per the forwarding graphs and service descriptors.

UEs 301-309 wirelessly attach to RANs 311-313 over LTE, WIFI, and/or 5GNR. RANs 311-313 interact with the AMF VNFs in NFVIs 321 to attach and serve UEs 301-309. Thus, UEs 301-309 have connectivity to the distributed ledger VNFs over RANs 311-313 and the network VNFs in NFVIs 321. UEs 301-309 execute their distributed ledger applications and transfer ledger data to the ledger endorsement VNFs. To endorse the data transaction, the endorsement VNFs execute a test transaction with the ledger data to generate a test result. If the test result complies with pre-stored endorsement rules, then the ledger endorsement VNFs transfer the endorsed transaction to ledger orderer VNFs that distribute the endorsed transaction to ledger peer VNFs. In response to the transaction endorsement, the ledger peer VNFs execute their chain code to process the ledger data to generate the ledger result. The ledger peer VNFs reach a consensus on the ledger result before committing the ledger result data to distributed ledger databases in the immutable blockchain format. The blockchain format includes a hash of the previous data block in the current top data block, and the same data blocks are stored across all NFVIs 321.

The individual ledger client VNFs interact with select distributed ledger VNFs and select AI engine VNFs per the forwarding graphs, service descriptors, and subsequent MANO instructions. The ledger client VNFs read the top blocks of their selected distributed ledger VNFs and select some of the top block data per their data filter configurations, service descriptors, and subsequent MANO instructions. The ledger client VNFs transfer the selected top block data to the selected AI engine VNFs. The selected AI engine VNFs process their selected top block data to generate and transfer AI responses. In some examples, RANs 311-313, the network VNFs, distributed ledger VNFs, virtual switches, and NFVI operating system may also transfer ledger data to the distributed ledger VNFs for subsequent processing by the AI engine VNFs. As noted, some UEs may host AI engines and the ledger client VNFs would transfer selected top block data to the selected AI engines in the UEs.

Advantageously, wireless communication system 300 selectively and securely couples distributed ledgers to AI engines. Moreover, wireless communication system 300 uses wireless UEs 301-309 and RANs 311-313 to securely and selectively load the distributed ledgers with pertinent data for the AI engines.

Figure 4:
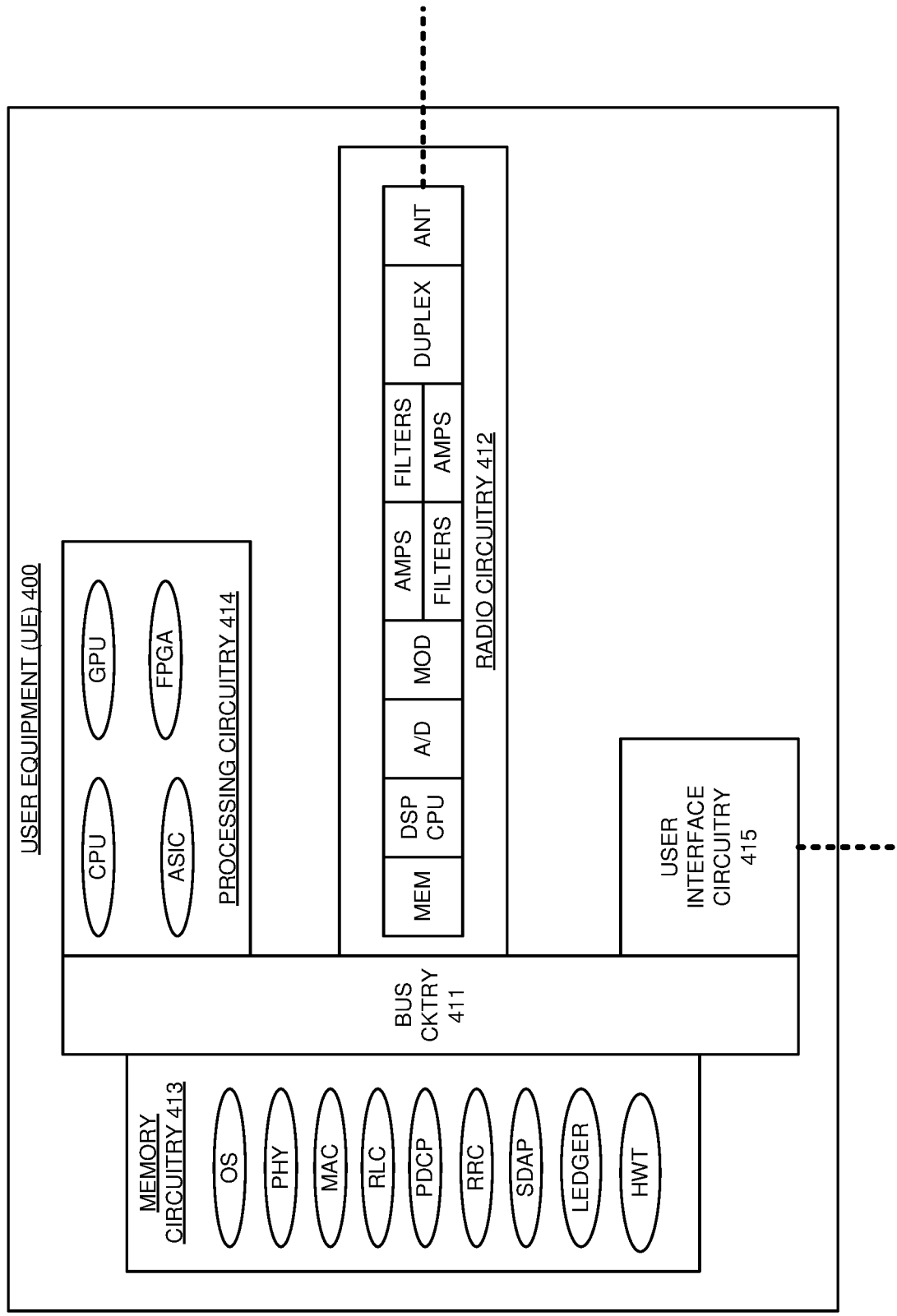
FIG. 4 illustrates User Equipment (UE) that transfers user application data to the distributed ledgers for delivery to the AI engines.

FIG. 4 illustrates User Equipment 400 that transfers ledger data to distributed ledgers for subsequent processing by AI engines. UE 400 is an example of UEs 301-309, although UEs 301-309 may differ. UE 400 comprises bus circuitry 411, radio circuitry 412, memory circuitry 413, processing circuitry 414, and user interface circuitry 415. Bus circuitry 411 couples radio circuitry 412, memory circuitry 413, processing circuitry 414, and user interface circuitry 415. Memory circuitry 413 comprises volatile and non-volatile memories like RAM, flash, disc, tape, and the like. Memory circuitry 413 has stores an operating system (OS), network applications, ledger application, and hardware-trust application (HWT). The network applications comprise Physical Layer (PHY), Media Access Control (MAC), Radio Link Control (RLC), Packet Data Convergence Protocol (PDCP), Radio Resource Control (RRC), Service Data Application Protocol (SDAP), and the like. Processing circuitry 414 comprises CPUs, GPUs, ASICs, Field Programmable Gate Arrays (FPGAs), and/or some other computer hardware. Processing circuitry 414 comprises a secret read-only hardware-trust key. Processing circuitry 414 executes the operating system and applications to drive radio circuitry 412 and user interface circuitry 415. User interface circuitry 415 comprises displays, speakers, microphones, sensors, cameras, transceivers, machine controllers, and/or some other user components.

Radio circuitry 412 comprises antennas (ANT), duplexers (DUPLEX), filters, amplifiers (AMPS), modulators (MOD), Analog/Digital interfaces (A/D), Digital Signal Processors (DSP), CPUs, and memory (MEM). The antennas in radio circuitry 412 exchange wireless data and signaling with wireless access points in RANs. The DSP/CPUs execute firmware/software to drive the exchange of the data and signaling between the antennas and the radio memory. Processing circuitry 414 executes the operating systems and network applications to drive the exchange of data and signaling between the radio memory and memory circuitry 413.

The hardware-trust application interacts with the hardware-trust server to establish hardware-trust by processing hardware-trust challenges with the hardware trust key to return hardware trust results and obtain hardware-trust digital certificates. The hardware-trust application shares its hardware-trust digital certificates and verifies other hardware-trust digital certificates using a public key of the hardware-trust server.

UE 400 may host distributed ledgers and/or AI engines. Ledger clients may read top block information from distributed ledgers in UE 400. The ledger clients may transfer top block information to AI engines in UE 400.

The ledger application generates ledger data—possibly with sensors in user interface circuitry 415 that collect data for environment, weather, location, video, audio, and the like. The network applications store UL data (including ledger data) and signaling in the radio memory. In radio circuitry 412, the DSP/CPUs transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to RANs.

In radio circuitry 412, the antennas receive wireless Downlink (DL) signals from the wireless access points in the RANs and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data and signaling from the DL signals. The DSP/CPUs transfer the DL data and signaling to memory circuitry 413. The network applications process the DL data and signaling in memory circuitry 413 to forward ledger instructions to the ledger application and hardware-trust instructions to the hardware-trust application.

The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The MAC maps between the MAC transport channels and MAC logical channels. MAC functions include buffer status, power headroom, channel quality, Hybrid Automatic Repeat Request (HARQ), user identification, random access, user scheduling, and QoS. The RLC maps between the MAC logical channels and Protocol Data Units (PDUs). RLC functions comprise ARQ, sequence numbering and resequencing, segmentation and resegmentation. The RLC exchanges data and signaling with the PDCP. The PDCP maps between the PDUs from the RLC and Service Data Units (SDUs) for the RRC/SDAP. PDCP functions comprise security ciphering, header compression and decompression, sequence numbering and re-sequencing, de-duplication. The PDCP exchange SDUs with the RRC and SDAP.

The RRC handles UE information like IMSI, IMEI, IMPU, and/or IMPI during RRC attachment. The RRC handles UE on-net authentication. The RRC interacts with wireless network controllers like Access and Mobility Functions (AMFs) and/or Mobility Management Entities (MMEs) to establish and terminate data sessions. The RRC supports N1 and Non-Access Stratum (NAS) messaging with the MMEs/AMFs. The RRC handles security and key management, handover operations, status reporting, QoS, system broadcasts, and network pages. The SDAP exchanges S3 data with UPFs under the control of SMFs. The SDAP maps between the SDUs and the QoS flows and mark the QoS flows with the proper QoS.

Figure 5:
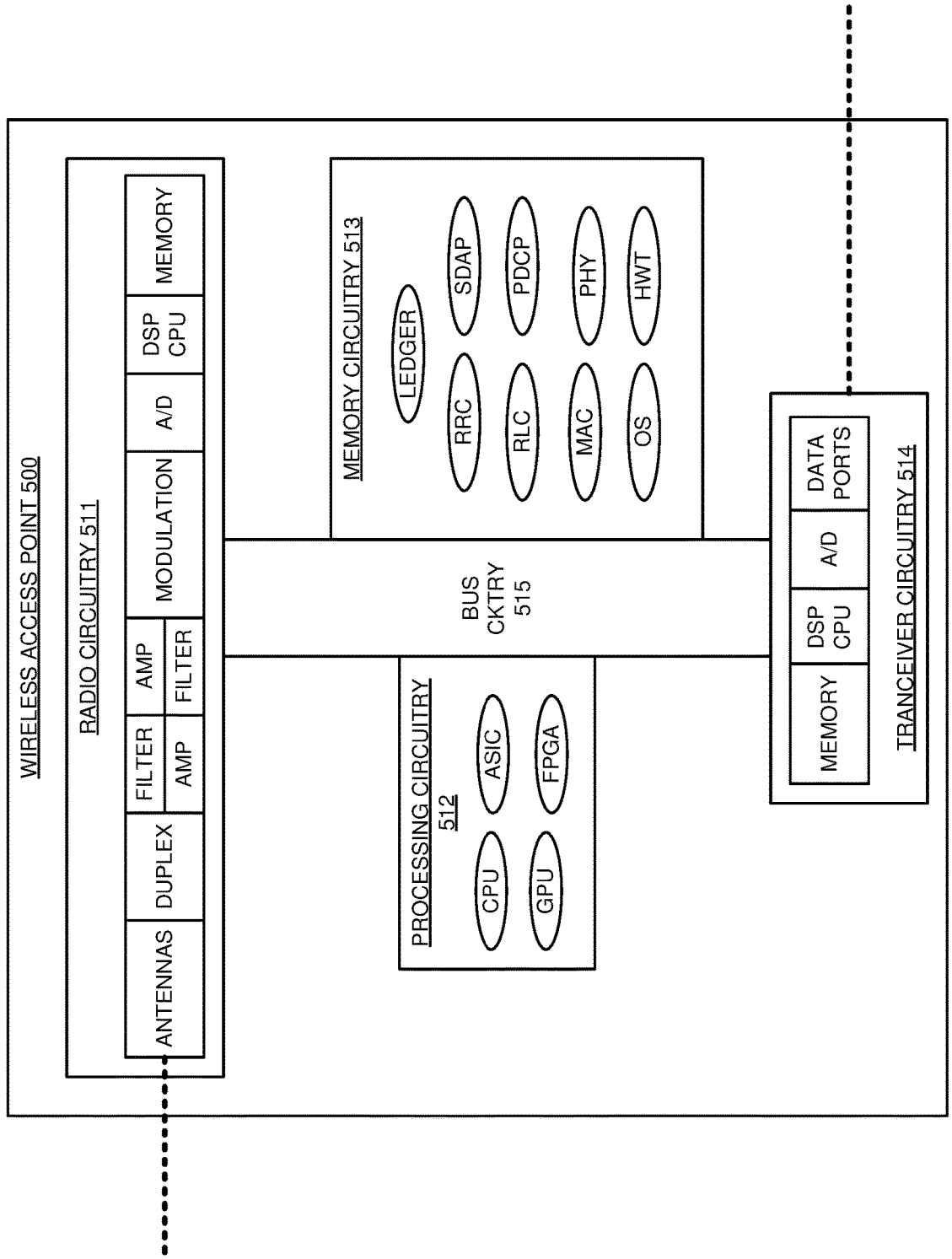
FIG. 5 illustrates a wireless access point that transfers Radio Access Network (RAN) data and user application data to the distributed ledgers for delivery to the AI engines.

FIG. 5 illustrates wireless access point 500 that transfers ledger data to distributed ledgers for delivery to AI engines. Wireless access point 500 is an example of RANs 311-313, although RANs 311-313 may differ. Wireless access point 500 comprises radio circuitry 511, processing circuitry 512, memory circuitry 513, transceiver circuitry 514, and bus circuitry 515. Bus circuitry 515 couples radio circuitry 511, memory circuitry 512, processing circuitry 513, and transceiver circuitry 514. Processing circuitry 512 comprises CPUs, GPUs, ASICs, FPGAs, and/or some other computer circuitry. Processing circuitry 512 comprises a secret read-only hardware-trust key. Memory circuitry 513 comprises volatile and non-volatile memories like RAM, flash, disc, tape, and the like. Memory circuitry 513 stores an operating system, network applications, ledger application, and hardware-trust application. The network applications comprise PHY, MAC, RLC, PDCP, RRC, SDAP, and the like. Processing circuitry 512 executes the operating system and applications to drive radio circuitry 511 and transceiver circuitry 514.

Radio circuitry 511 comprises antennas, duplexers, filters, amplifiers, modulators, A/D interfaces, DSP/CPU, and memory. The antennas in radio circuitry 511 exchange wireless data and signaling with wireless UEs. The DSP/CPUs execute firmware/software to drive the exchange of the data and signaling between the antennas and radio memory. Processing circuitry 512 executes the operating systems and network applications to drive the exchange of data and signaling between radio circuitry 511 and transceiver circuitry 514 through memory circuitry 513. The hardware-trust application interacts with the hardware-trust server to establish hardware-trust by processing hardware-trust challenges with the hardware trust key to return hardware trust results and obtain hardware-trust digital certificates. The hardware-trust application shares its hardware-trust digital certificates and verifies other hardware-trust digital certificates using a public key of the hardware-trust server. The ledger application generates and transfers ledger data—possibly with sensors that collect data for environment, weather, location, video, audio, and the like.

Wireless access point 500 may host distributed ledgers and/or AI engines. Ledger clients may read top block information from distributed ledgers in wireless access point 500. The ledger clients may transfer top block information to AI engines wireless access point 500.

In radio circuitry 511, the antennas receive wireless Uplink (UL) signals from wireless UEs and transfer corresponding electrical UL signals through the duplexers to the amplifiers. The amplifiers boost the UL signals for filters which attenuate unwanted energy. In modulation, demodulators down-convert the UL signals from their carrier frequencies. The A/D interfaces convert the analog UL signals into digital UL signals for the DSP/CPUs. The DSP/CPUs recover UL data and signaling from the UL signals—including ledger data. The DSP/CPUs transfer the UL data and signaling to memory circuitry 513. The network applications process the UL data and signaling in memory circuitry 513 generate additional UL signaling. The network applications forward the UL data (including ledger data) and signaling over transceiver circuitry 514 to a network core that hosts the ledger clients.

Transceiver circuitry 514 receives DL data and signaling from the network core and stores the DL data and signaling in memory circuitry 513. The network applications process the DL data and signaling in memory circuitry 513 generate additional DL signaling. The network applications forward the DL data and signaling to radio circuitry 511. In radio circuitry 511, the DSP/CPUs transfer corresponding DL signals to the A/D interface. The A/D interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to the UEs.

The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping. The MAC maps between the MAC transport channels and MAC logical channels. MAC functions include buffer status, power headroom, channel quality, HARQ, user identification, random access, user scheduling, and QoS. The RLC maps between the MAC logical channels and PDUs. RLC functions comprise ARQ, sequence numbering and resequencing, segmentation and resegmentation. The RLC exchanges data and signaling with the PDCP. The PDCP maps between the PDUs from the RLC and SDUs for the RRC/SDAP. PDCP functions comprise security ciphering, header compression and decompression, sequence numbering and re-sequencing, de-duplication. The PDCP exchange SDUs with the RRC and SDAP. The RRC interacts with wireless network controllers like AMFs and/or MMEs to establish and terminate data sessions. The RRC supports N1 and NAS messaging with the MMEs/AMFs. The RRC handles security and key management, handover operations, status reporting, QoS, system broadcasts, and network pages. The SDAP exchanges S3 data with UPFs under the control of SMFs. The SDAP maps between the SDUs and the QoS flows and mark the QoS flows with the proper QoS.

Figure 6:
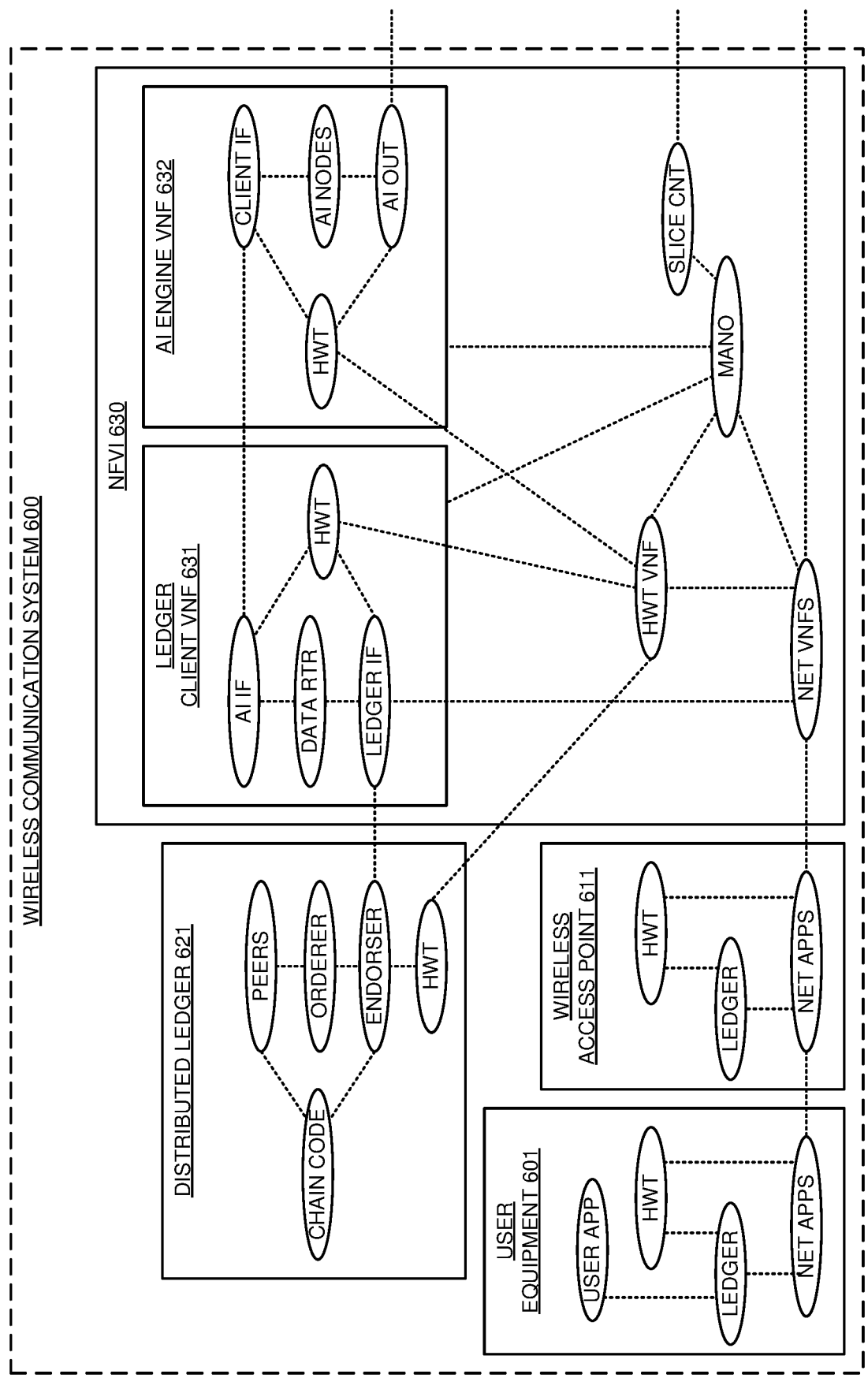
FIG. 6 illustrates a wireless communication system comprising an NFVI that selectively transfers top block data from distributed ledgers to AI engines.

FIG. 6 illustrates wireless communication system 600 comprising NFVI 630 that selectively transfers top block data from distributed ledger 621 to AI engine VNF 632. Wireless communication system 600 is an example of communication system 100, although system 100 may differ. Wireless communication system 600 comprises User Equipment (UE) 601, wireless access point 611, distributed ledger 621, and NFVI 630. Communication system 600 has been simplified for clarity and typically includes many more UEs, wireless access points, NFVIs, client VNFs, AI VNFs, and distributed ledgers than the amount shown. In some examples, UE 601 and/or wireless access point 611 may host distributed ledgers and/or AI engines.

In NFVI 630, a slice controller (CNT) receives operator instructions and responsively launches a network slice that includes network VNFs, a hardware-trust server (HWT) VNF, ledger client VNF 631, and AI engine VNF 632. The slice controller directs the MANO to instantiate forwarding graphs and service descriptors for the network slice. The forwarding graphs and service descriptors specify the network VNFs, hardware-trust server VNF, ledger client VNF 631, AI engine VNF 632, virtual switch connections, and physical network interconnections. The MANO directs NFVI 630 to execute network VNFs, hardware-trust server VNF, ledger client VNF 631, and AI engine VNF 632 per quality-of-service metrics in the forwarding graphs and service descriptors.

NFVI 630 executes the network VNFs, hardware-trust VNF, ledger client VNF 631, AI engine VNF 632, the virtual switches, and other virtual machine components. In response to their forwarding graphs and service descriptors, the network VNFs and the hardware-trust components of VNFs 631-632 interact with the hardware-trust server VNF to establish hardware-trust and obtain hardware-trust digital certificates. Typically, the hardware-trust server issues random numbers to the VNFs which have their hardware hash the random numbers with physically embedded and read-only hardware-trust codes to return hardware-trust results that the hardware trust server verifies with its own copy of the hardware-trust codes. The network VNFs and ledger client VNF 631 establish connectivity and exchange hardware-trust digital certificates per the forwarding graphs and service descriptors to establish hardware-trust. The AI interfaces (IF) in ledger client VNF 631 and the client interfaces in AI engine VNF 632 establish connectivity and exchange hardware-trust digital certificates per the forwarding graphs and service descriptors to establish hardware-trust. Ledger client VNF 631 may be instructed by MANO to interact with new AI engines.

The network VNFs establish connectivity to wireless access point 611 over physical network interfaces based on their forwarding graphs and service descriptors. The network VNFs may be instructed by MANO to interact with new wireless access points. The hardware-trust applications in wireless access point 611 interact with the hardware trust server VNF to establish hardware-trust and obtain hardware-trust digital certificates. The network VNFs in NFVI 630 and the hardware-trust application in wireless access point 611 exchange their hardware-trust digital certificates to establish hardware-trust.

Ledger client VNF 631 establishes connectivity to distributed ledger 621 over physical network interfaces based on its forwarding graphs and service descriptors. Ledger client VNF 631 may be instructed by MANO to interact with new distributed ledgers. The hardware-trust application in distributed ledger 621 interacts with the hardware trust server VNF to establish hardware-trust and obtain hardware-trust digital certificates. An endorser node in distributed ledger 621 and the ledger interface in VNF 631 exchange their hardware-trust digital certificates to establish hardware-trust.

The network applications in UE 601 attach to the network applications in wireless access point 611 and then to the network applications in NFVI 630. For example, an AMF may dip an AUSF to authorize services for UE 601, and an SMF may dip a PCF to determine policies for UE 601. In UE 601, the hardware-trust application interacts with the hardware trust server over the network applications to establish hardware-trust and obtain hardware-trust digital certificates. The hardware-trust applications in UE 601 and wireless access point 611 exchange and verify hardware-trust digital certificates to establish hardware trust. At this point, the network VNFs in NFVI 630 have hardware-trust in wireless access point 611 and in ledger client VNF 631. Wireless access point 611 has hardware-trust in UE 601. Ledger client VNF 631 has hardware-trust in distributed ledger 621 and AI engine VNF 632.

In UE 601, the user application generates ledger data for the ledger application. The ledger data could be sensor data like video, audio, atmospheric conditions, and the like. If the hardware-trust application indicates current hardware-trust between UE 601 and wireless access point 611, then the ledger application transfers the ledger data over the network applications in UE 601 to the network applications in wireless access point 611. In wireless access point 611, the network applications and/or the ledger application may also generate ledger data for the ledger application. If the hardware-trust application indicates current hardware-trust between wireless access point 611 and UE 601 and between wireless access point 611 and NFVI 630, then the ledger application in wireless access point 611 transfers the ledger data over the network applications to the network VNFs in NFVI 630.

In some examples, the network VNFs, hardware-trust server VNF, and MANO may also transfer ledger data to the network VNFs for delivery to ledger client VNF 631. If the hardware-trust server VNF indicates current hardware-trust between NFVI 630 and wireless access appoint 611 and between NFVI 630 and ledger client VNF 631, then the network applications in NFVI 630 transfer the ledger data to the ledger interface in ledger client VNF 631. If the hardware-trust component in ledger client VNF 631 indicates current hardware-trust between ledger client VNF 631 and the network applications in NFVI 630 and between ledger client VNF 631 and the endorser node distributed ledger 621, then the ledger interface in ledger client VNF 631 transfers the ledger data to the endorser node in distributed ledger 621. If the hardware-trust application in distributed ledger 621 indicates current hardware-trust between the endorser node and ledger client VNF 631, then the endorser node processes the ledger data through a distributed ledger transaction.

In distributed ledger 621, the endorser node executes chain code to perform a test transaction with the ledger data to generate a test result. If the test result complies with pre-stored endorsement rules, then the endorser node transfers the endorsed transaction to a ledger orderer node that distributes the endorsed transaction to ledger peer nodes per a peer distribution list. In response to the transaction endorsement, the ledger peer nodes execute the chain code to process the ledger data to generate the ledger result. The ledger peer nodes reach a consensus on the ledger result before committing the ledger result data to their distributed ledger databases in an immutable blockchain format. Ledger client VNF 631 interacts with the endorser node to read the top blocks of distributed ledger 621. Ledger client VNF 631 selects some of the top block data for AI engine 632 data per its data filter, service descriptor, or MANO instructions.

In ledger client VNF 631, the ledger interface routes the ledger data over a data router to an AI interface. If the hardware-trust component in ledger client VNF 631 indicates current hardware-trust between VNF 631 and AI engine VNF 632, then the AI interface transfers the ledger data to a client interface in AI engine VNF 632. If the hardware-trust component in AI engine VNF 632 indicates current hardware-trust between VNF 632 and ledger client VNF 631, then the client interface transfers the ledger data to AI nodes for AI processing. The AI nodes process the select top block data from distributed ledger 621 to generate AI responses. The AI nodes transfer the AI responses to various systems over an AI output component.

Consider an example where the goal is to process images and atmospheric data from various sources to generate an atmospheric quality scores for particular geographic areas. A network slice is generated that includes VNFs for distributed ledgers, ledger clients, AI engines, and hardware-trust. The slice controller loads ledger applications and hardware trust applications in various UEs and wireless access points. The UEs, wireless access points, ledger client VNFs, distributed ledger VNFs, and AI VNFs establish hardware-trust with one another. The UEs and wireless access points execute their ledger applications to collect images and atmospheric data like temperature, humidity, and air pressure. The UEs and wireless access points transfer their images and atmospheric data to the ledger client VNFs. The ledger client VNFs transfer the images and atmospheric data to the distributed ledger VNFs. The distributed ledger VNFs perform ledger transactions based on chain code, the images, and the atmospheric data. The distributed ledger VNFs commit the images, atmospheric data, and any chain code output to memory in the immutable block-chain format. The ledger client VNFs read the top blocks of the distributed ledgers, and in this example, the ledger client VNFs read the images and atmospheric data along with their source locations. The ledger client VNFs select images and atmospheric data from the particular geographic areas for a particular AI engine VNF. The ledger client VNFs transfer the selected images and atmospheric data for the given geographic areas to the particular AI engine VNF. The AI engine VNF processes the images and atmospheric data to develop atmospheric quality scores for the geographic areas.

Advantageously, wireless communication system 600 selectively and securely couples distributed ledgers to AI engines. Moreover, wireless communication system 300 uses wireless UEs and wireless access points to securely and selectively load the distributed ledgers with pertinent data for the AI engines.

The wireless data network circuitry described above comprises computer hardware and software that form special-purpose networking circuitry that selectively and securely couples distributed ledgers to AI engines. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry that selectively and securely couples distributed ledgers to AI engines.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to generate Artificial Intelligence (AI) responses to network data, the method comprising:
   computer hardware circuitry hosting network functions, distributed ledgers, ledger clients, and AI engines;
   the network functions, the distributed ledgers, the ledger clients, and the AI engines establishing hardware-trust with each other using hardware-trust codes physically embedded in read-only memory of the computer hardware circuitry;
   the network functions serving User Equipment (UEs) over Radio Access Networks (RANs), and in response, transferring the network data to the distributed ledgers;
   the distributed ledgers receiving and storing the network data;
   the ledger clients selecting some of the network data from the distributed ledgers and transferring the selected network data to the AI engines; and
   the AI engines receiving the selected network data, and in response, generating the AI responses.

2. The method of claim 1 wherein the AI engines comprise wireless network slices.

3. The method of claim 1 wherein the AI engines and the ledger clients comprise wireless network slices.

4. The method of claim 1 wherein:
   the AI engines comprise wireless network slices; and
   the ledger clients transferring the selected network data to the AI engines comprises transferring the selected network data to the AI engines based on the wireless network slices.

5. The method of claim 1 wherein:
   the ledger clients and the AI engines comprise wireless network slices; and
   the ledger clients transferring the selected network data to the AI engines comprises transferring the selected network data to the AI engines based on the wireless network slices.

6. The method of claim 1 wherein:
   the network functions and the and the distributed ledgers comprise Virtual Network Functions (VNFs); and
   the computer hardware circuitry comprises a virtualized network infrastructure and hosting the network functions and the distributed ledgers comprises the virtualized network infrastructure hosting the VNFs.

7. The method of claim 1 wherein:
   the network functions and the ledger clients comprise Virtual Network Functions (VNFs); and
   the computer hardware circuitry comprises a virtualized network infrastructure and hosting the network functions and the ledger clients comprises the virtualized network infrastructure hosting the VNFs.

8. The method of claim 1 wherein:
   the network functions and the AI engines comprise Virtual Network Functions (VNFs); and
   the computer hardware circuitry comprises a virtualized network infrastructure and hosting the network functions and the AI engines comprises the virtualized network infrastructure hosting the VNFs.

9. The method of claim 1 wherein the network data comprises UE status data.

10. The method of claim 1 wherein the network data comprises RAN status data.

11. A wireless communication system to generate Artificial Intelligence (AI) responses to network data, the wireless communication system comprising:
    computer hardware circuitry configured to host network functions, distributed ledgers, ledger clients, and AI engines;
    the network functions, the distributed ledgers, the ledger clients, and the AI engines configured to establish hardware-trust with each other using hardware-trust codes physically embedded in read-only memory of the computer hardware circuitry;
    the network functions configured to serve User Equipment (UEs) over Radio Access Networks (RANs), and in response, transfer the network data to the distributed ledgers;
    the distributed ledgers configured to receive and store the network data;
    the ledger clients configured to select some of the network data from the distributed ledgers and transfer the selected network data to the AI engines; and
    the AI engines configured to receive the selected network data, and in response, generate the AI responses.

12. The wireless communication system of claim 11 wherein the AI engines comprise wireless network slices.

13. The wireless communication system of claim 11 wherein the AI engines and the ledger clients comprise wireless network slices.

14. The wireless communication system of claim 11 wherein:
    the AI engines comprise wireless network slices; and
    the ledger clients are configured to transfer the selected network data to the AI engines based on the wireless network slices to transfer the selected network data to the AI engines.

15. The wireless communication system of claim 11 wherein:
- the ledger clients and the AI engines comprise wireless network slices; and
- the ledger clients are configured to transfer the selected network data to the AI engines based on the wireless network slices to transfer the selected network data to the AI engines.

16. The wireless communication system of claim 11 wherein:
- the network functions and the distributed ledgers comprise Virtual Network Functions (VNFs); and
- the computer hardware circuitry comprises a virtualized network infrastructure configured to host the VNFs.

17. The wireless communication system of claim 11 wherein:
- the network functions and the ledger clients comprise Virtual Network Functions (VNFs); and
- the computer hardware circuitry comprises a virtualized network infrastructure configured to host the VNFs.

18. The wireless communication system of claim 11 wherein:
- the network functions and the AI engines comprise Virtual Network Functions (VNFs); and
- the computer hardware circuitry comprises a virtualized network infrastructure configured to host the VNFs.

19. The wireless communication system of claim 11 wherein the network data comprises UE status data and RAN status data.

20. A wireless communication system to generate Artificial Intelligence (AI) responses to network data, the wireless communication system comprising:
- Network Function Virtualization Infrastructure (NFVI) configured to execute network Virtual Network Functions (VNFs), a hardware trust VNF, a ledger client VNF, and an AI engine VNF;
- computer hardware circuitry configured to host a distributed ledger;
- the network VNFs, ledger client VNF, AI engine VNF, and the distributed ledger configured to establish hardware-trust with the hardware trust VNF using hardware-trust codes physically embedded in read-only memory of the NFVI and the computer hardware circuitry;
- the network VNFs configured to serve User Equipment (UEs) over Radio Access Networks (RANs), and in response, transfer the network data to the distributed ledger;
- the distributed ledger configured to receive and store the network data;
- the ledger client VNF configured to select some of the network data from the distributed ledger and transfer the selected network data to the AI engine VNF; and
- the AI engine VNF configured to receive the selected network data, and in response, generate the AI responses.

* * * * *